April 4, 1939.  W. ELENBAAS ET AL  2,152,988
GASEOUS ELECTRIC DISCHARGE DEVICE
Filed May 17, 1935
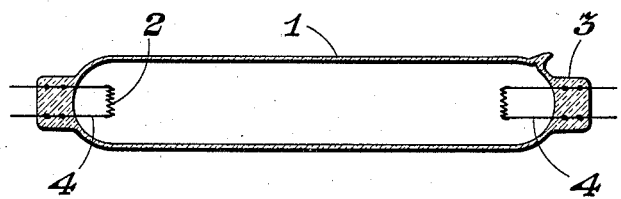
INVENTORS
Willem Elenbaas
Gottfried B. Jonas
Aart van Wyk
BY Harry E. Dunham
ATTORNEY Patented Apr. 4, 1939

2,152,988

UNITED STATES PATENT OFFICE 2,152,988

GASEOUS ELECTRIC DISCHARGE DEVICE

Willem Elenbass, Gottfried Bruno Jonas, and Aart van Wyk, Eindhoven, Netherlands, assignors to General Electric Company, a corporation of New York Application May 17, 1935, Serial No. 22,070
In Germany May 18, 1934

4 Claims. (Cl. 176—122)

Although silicate glasses of different compositions are known which are transparent to radiations in the ultraviolet region, these kinds of glass have not been utilised up to the present in sources of electric light radiating ultraviolet light which are operated at a very high temperature and with which the envelope becomes very hot.

It may be mentioned in this connection that it has previously been described that with an increasing temperature the absorption band of glass is shifted towards longer wavelengths of the spectre, that is to say the more strongly the closer to shorter wavelengths of the spectre the maximum of the absorption band is located at ordinary temperatures (Wien-Harms, Handbuch der Experimental-physik, 1928, volume 19, page 335). Thus, for example, it has been found that glasses of the compositions:

(1) 68.4% of $SiO_2$, 15.8% of $B_2O_3$, 5.3% of $K_2O$, 10.5% of ZnO, or (2) 76.6% of $SiO_2$, 15% of $B_2O_3$ and 8.4% of $K_2O$, which are satisfactorily transparent to ultraviolet light at ordinary temperatures transmit at high temperatures only few ultraviolet rays. At ordinary temperatures and with a thickness of 1 mm. the first mentioned glass of the composition indicated under (1) transmits the wavelength of 2967 Å. for 43% and at 600° C. for 12.5%. With the glass of the composition indicated under (2) the transmissibility is under the same conditions 50% and only 4.5% respectively.

According to the invention, sources of electric light of the above mentioned type are furnished with bulbs constituted by glass consisting of $SiO_2$, $B_2O_3$ and $Al_2O_3$, containing substantially no alkalioxide, for example less than 1%, and having a softening point of higher than 600° C. If desired, an alkaline earth oxide such as CaO may be added to the smelt. Use should preferably be made of glasses of this kind which have a content of $SiO_2$ higher than 70%. As glasses suitable for use in the sources of light according to the invention may be mentioned, for example, compositions such as (3) 77.2% of $SiO_2$, 10.7% of $Al_2O_3$, 5.4% of CaO and 7.0% of $B_2O_3$ or (4) 84.4% of $SiO_2$, 4.4% of $Al_2O_3$, 0.4% of CaO and 10.8% of $B_2O_3$.

Said glasses may contain slight amounts of other substances which have an only immaterially injurious effect on the optical properties and on the softening point.

Glasses of this kind have already been described in themselves, for example in connection with the fact that they have a low coefficient of expansion and furthermore on account of their capability of being sealed to quartz, which properties have been utilised with such sources of electric light to which the invention relates but in which just that portion of the bulb which allows the light to pass consisted of quartz glass.

However, as mentioned already, the said kinds of glass although having a high softening point have not been employed in these sources of light as the constituent material for the envelope.

Experiments which led to the present invention have shown that the transmissibility of these kinds of glass in the ultraviolet region of the spectrum is very satisfactory even at a high operating temperature of the above-mentioned sources of light, although with these glasses, too, the transmissibility decreases when the temperature increases. The decrease in transmissibility occurring at said high operating temperature does however not entail any inconvenience in practice. Thus, it has been found that at 600° C. and with a thickness of 1 mm. the glasses utilised in accordance with the invention transmit the wave length of 2967 Å. for more than 70%. These kinds of glass may be employed with particular advantage for so-called high pressure mercury vapour discharge tubes which may comprise one or more cathodes of good electron emitting capacity and in which the discharge takes place in mercury vapour under high pressure. A "discharge in mercury vapour under high pressure" has to be understood to mean a discharge in mercury vapour which has the property of being contracted instead of filling the whole of the cross-sectional area of the tube. It has been stated that the glass utilised in accordance with the invention is satisfactorily resistant to the influence of the high pressure mercury vapour discharge.

The invention will be explained more fully with reference to the accompanying drawing which diagrammatically represents by way of example one mode of realisation.

Figure 1 represents a high pressure mercury vapour discharge tube constituted by a glass vessel 1 consisting of one of the glasses of the compositions indicated under 3 or 4. Said tube contains cathodes 2 of good electron emitting capacity and has pinches 3 into which current supply wires 4 are sealed. The glass vessel 1 contains a slight amount of mercury.

What we claim is:

1. A gaseous electric discharge device comprising a container, electrodes sealed therein, a gaseous atmosphere therein, said container comprising a radiation transmitting glass consisting of silica, alumina, alkaline earth oxide and boric oxide, the silica content being less than about 85% and more than 70%, the alumina content being less than 11% and more than 4%, the alkaline earth oxide content being less than 6% and more than 0.3% and the boric oxide content being less than 11% and more than 6%.

2. A gaseous electric discharge device comprising a container, electrodes sealed therein, a gaseous atmosphere therein, said container comprising a radiation transmitting glass containing:—

| | Percent |
|---|---|
| Silica ($SiO_2$) | 77.2 |
| Alumina ($Al_2O_3$) | 10.7 |
| Calcium oxide (CaO) | 5.4 |
| Boric oxide ($B_2O_3$) | 7.0 |

3. A gaseous electric discharge device comprising a container, electrodes sealed therein, a gaseous atmosphere therein, said container comprising a radiation transmitting glass containing:—

| | Percent |
|---|---|
| Silica ($SiO_2$) | 84.4 |
| Alumina ($Al_2O_3$) | 4.4 |
| Calcium oxide (CaO) | 0.4 |
| Boric oxide ($B_2O_3$) | 10.8 |

4. A gaseous electric discharge ultra violet generator device comprising a container, electrodes sealed therein, a gaseous atmosphere therein, said container comprising a radiation transmitting glass consisting of silica, alumina, alkaline earth oxide and boric oxide, the silica content being less than about 85% and more than 70%, the alumina content being less than 11% and more than 4%, the alkaline earth oxide content being less than 6% and more than 0.3% and the boric oxide content being less than 11% and more than 6%, said glass containing less than 1% alkali oxide.

WILLEM ELENBAAS.
GOTTFRIED BRUNO JONAS.
AART van WYK.